(No Model.)
W. STEBBINS.
HOSE NOZZLE.
No. 396,119. Patented Jan. 15, 1889.
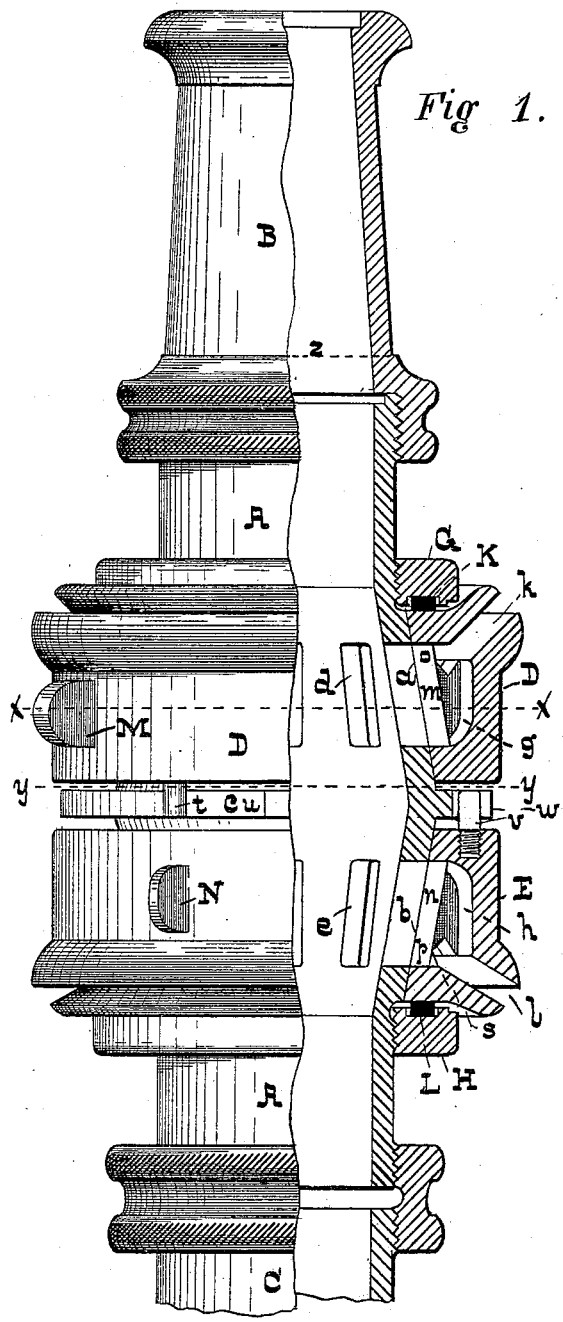
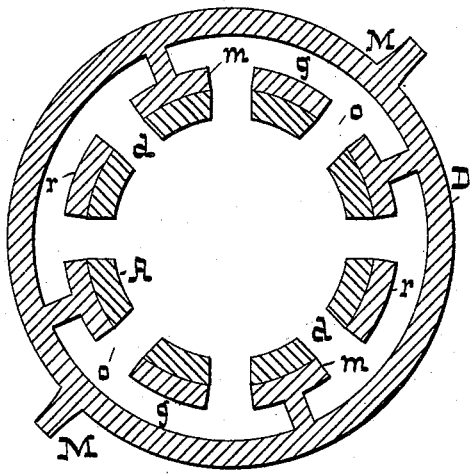
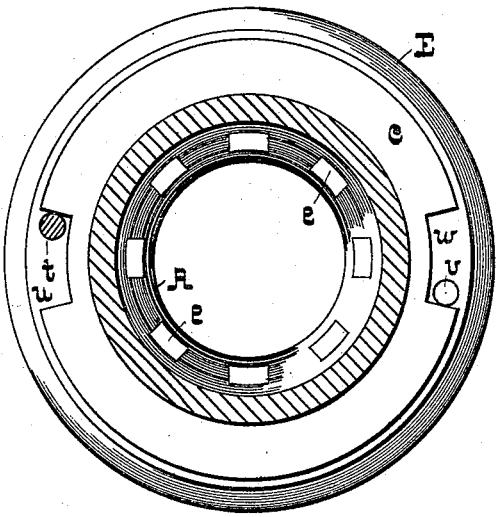
WITNESSES
Dan'l Fisher
INVENTOR
Wallace Stebbins,

UNITED STATES PATENT OFFICE.

WALLACE STEBBINS, OF BALTIMORE, MARYLAND.

HOSE-NOZZLE.

SPECIFICATION forming part of Letters Patent No. 396,119, dated January 15, 1889.

Application filed October 17, 1888. Serial No. 288,349. (No model.)

*To all whom it may concern:*

Be it known that I, WALLACE STEBBINS, of the city of Baltimore and State of Maryland, have invented certain Improvements in Hose-Nozzles, of which the following is a specification.

This invention relates to certain improvements in the outer end of the nozzle, or that part thereof which is situated forward of the cock or valve which controls the flow of water, as will hereinafter fully appear.

In the description of the said invention which follows reference is made to the accompanying drawings, forming a part hereof, and in which—

Figure 1 is a longitudinal view, partly in section, of the improved nozzle; and Fig. 2, a cross-section of the same, taken on the dotted line $x$ $x$. Fig. 3 is a similar section taken on the dotted line $y$ $y$.

Similar letters of reference indicate similar parts in all the figures.

In the said drawings, A represents the nozzle, or that part thereof which is situated between the tip B and the cock or valve C, a part only of which is shown. The nozzle is provided with two conical faces, $a$ and $b$, which are tapered or inclined in opposite directions and separated by a flange, $c$. Both of these conical faces are perforated, the apertures, which are denoted by $d$ and $e$, forming means for the passage of water from the nozzle when its escape from the end is prevented or impeded.

D and E are hollow sleeves, with conical inner surfaces which fit closely the conical faces $a$ and $b$. The annular chamber in the sleeve D is designated by $g$, and the corresponding chamber in the sleeve E is denoted by $h$, and both annular chambers have angularly-directed outlets $k$ and $l$, through which, under circumstances hereinafter described, water issues in the form of a sheet. The inner conical walls, $m$ and $n$, of the two sleeves have aperatures $o$ and $p$, of practically the same size as the ones $d$ and $e$ in the nozzle; and when the sleeves are turned the spaces $r$ and $s$ between the apertures $o$ and $p$ cover or uncover the apertures in the nozzle, and thereby allow or prevent lateral discharge of water from the angularly-directed openings in the form of a sheet. The circumferential movement of the outer sleeve, D, required to open or close the apertures $d$, is limited by means of a pin, $t$, which projects from the said sleeve into a notch or rabbet, $u$, in the flange $c$, and a similar movement of the sleeve E is restricted by means of another pin, $v$, which extends from the sleeve into another notch, $w$, in the said flange.

The sleeves D and E are held in place on their respective conical faces on the nozzle by means of collars G and H, having anti-friction rings K and L, which bear against the ends of the sleeves. The sleeves are operated by hand, through the medium of thumb-pieces M and N.

To effect a forward or backward lateral discharge of water, it is first necessary to substitute for the tip B a cap which corresponds in shape with the base of the tip, and which is shown by the dotted outline marked $z$. The proper sleeve is then turned and a dished sheet is projected, which, in view of the openings in the sleeves being of a fixed size, cannot vary or be changed in size.

I claim as my invention—

1. In combination with a nozzle having a perforated conical face, a circumferentially-moving sleeve adapted to fit over the said face, having an annular chamber with apertures in its inner wall corresponding, practically, with those in the nozzle, and an angularly-directed outer escape-opening, substantially as and for the purpose specified.

2. In combination with a nozzle having two conical perforated faces separated by a flange, a pair of sleeves having annular chambers, with angularly-directed escape-openings, and inner perforated walls, substantially as and for the purpose specified.

3. In combination with a nozzle having a perforated conical face, a sleeve adapted to fit over the said conical face, having an annular chamber and a perforated inner wall, a flange on the said nozzle, and a pin projecting from the said sleeve into a notch in the said flange, substantially as and for the purpose specified.

WALLACE STEBBINS.

Witnesses:
C. W. CHASE,
GEO. McCAFFRAY.